United States Patent [19]

Haines

[11] 4,339,168
[45] Jul. 13, 1982

[54] HOLOGRAMS CREATED FROM CYLINDRICAL HOLOGRAM MASTERS

[75] Inventor: Kenneth A. Haines, San Jose, Calif.

[73] Assignee: Eidetic Images, Inc., Santa Clara, Calif.

[21] Appl. No.: 102,430

[22] Filed: Dec. 10, 1979

Related U.S. Application Data

[63] Continuation-in-part of Ser. No. 875,172, Feb. 6, 1978, abandoned, and Ser. No. 922,228, Jul. 5, 1978, abandoned.

[51] Int. Cl.³ .................... G03H 1/20; G03H 1/26
[52] U.S. Cl. .................... 350/3.69; 350/3.65; 350/3.76
[58] Field of Search .................... 350/3.69, 3.75, 3.76, 350/3.65

[56] References Cited

U.S. PATENT DOCUMENTS

| | | | |
|---|---|---|---|
| 3,633,989 | 1/1972 | Benton | 350/3.69 |
| 3,647,289 | 3/1969 | Weber | 350/3.69 |
| 3,700,302 | 10/1972 | Mohon et al. | 350/3.65 |
| 3,758,186 | 9/1973 | Brumm | 350/3.69 |
| 3,784,276 | 1/1974 | Wuerker et al. | 350/3.65 |
| 3,838,903 | 10/1974 | Leith et al. | 350/3.69 |
| 3,942,861 | 3/1976 | George | 350/3.69 |
| 4,206,965 | 6/1980 | McGrew | 350/3.76 |

OTHER PUBLICATIONS

Leith, *Scientific American*, vol. 235, No. 4, Oct. 1976.
Rotz et al., *Applied Physics Letters*, vol. 8, No. 6, Mar. 1966, pp.146-148.
Brumm, *Applied Optics*, vol. 5, No. 12, Dec. 1966, pp. 1946-1947.

*Primary Examiner*—Ronald J. Stern
*Attorney, Agent, or Firm*—Limbach, Limbach & Sutton

[57] ABSTRACT

A method of constructing cylindrical holograms in which the image space is the entire space within the cylinder, and a method of constructing holograms on surfaces of other shapes, such as flat surfaces, both from original cylindrical hologram masters. The method uses cylindrical and other reflectors to recreate pseudoscopic images within the cylindrical volume of original cylindrical hologram masters and to form construction reference waves which are appropriate for the new holograms created within this image space.

50 Claims, 10 Drawing Figures

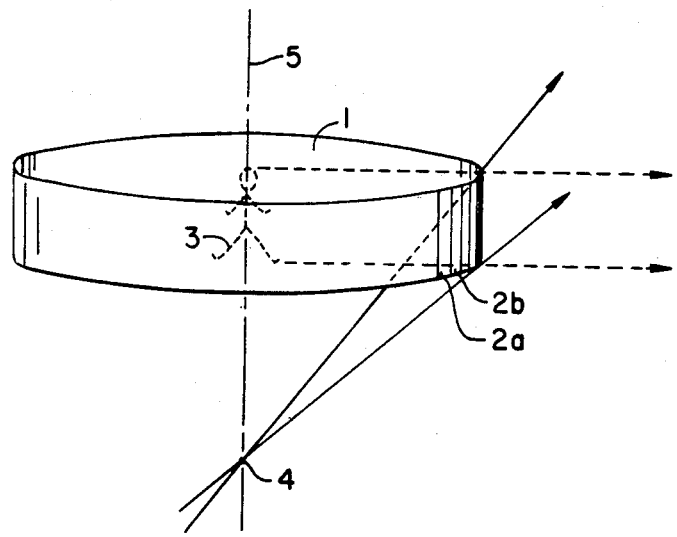
FIG.__1.
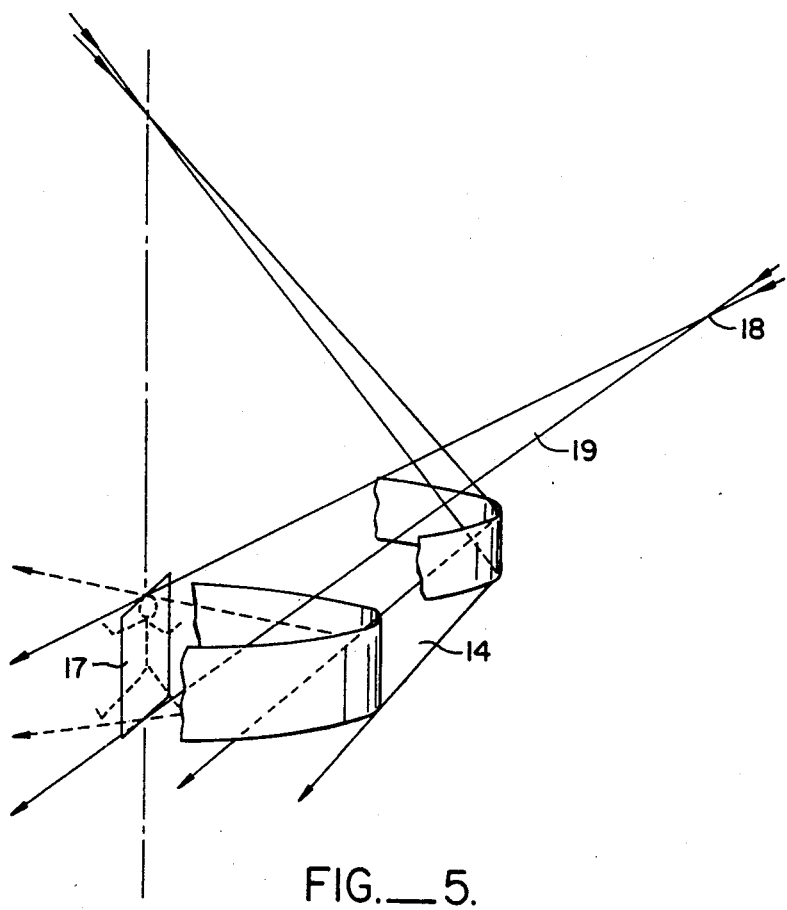
FIG.__5.

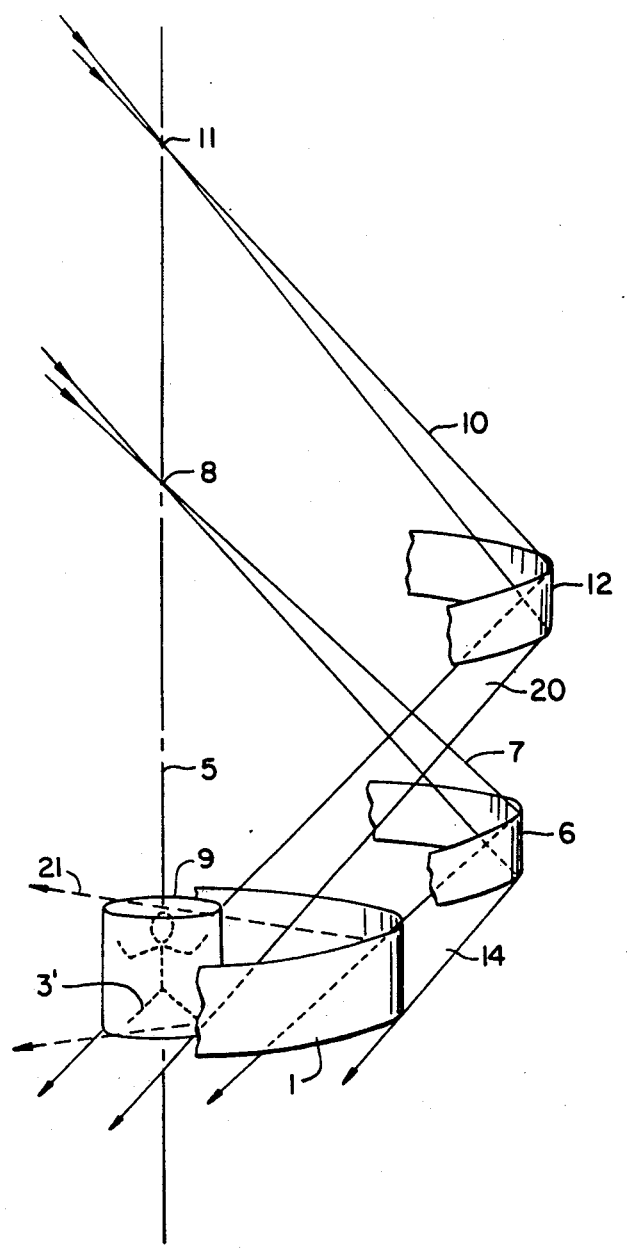
FIG._2.

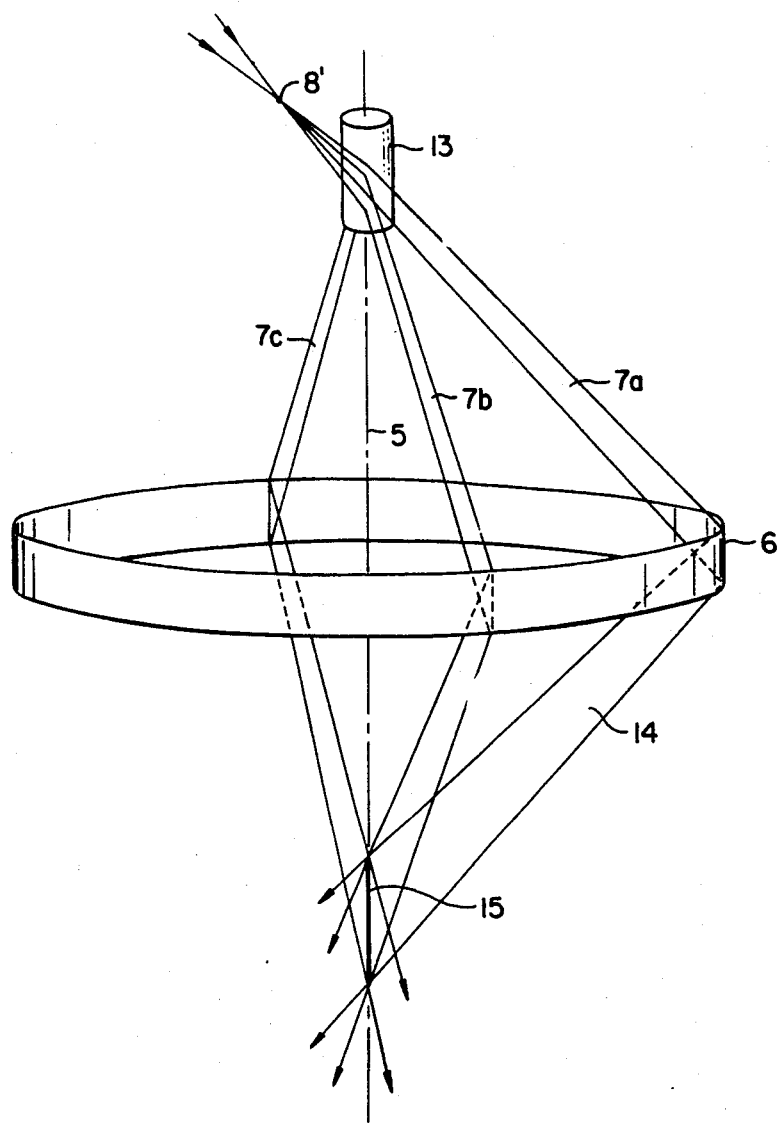
FIG._3.

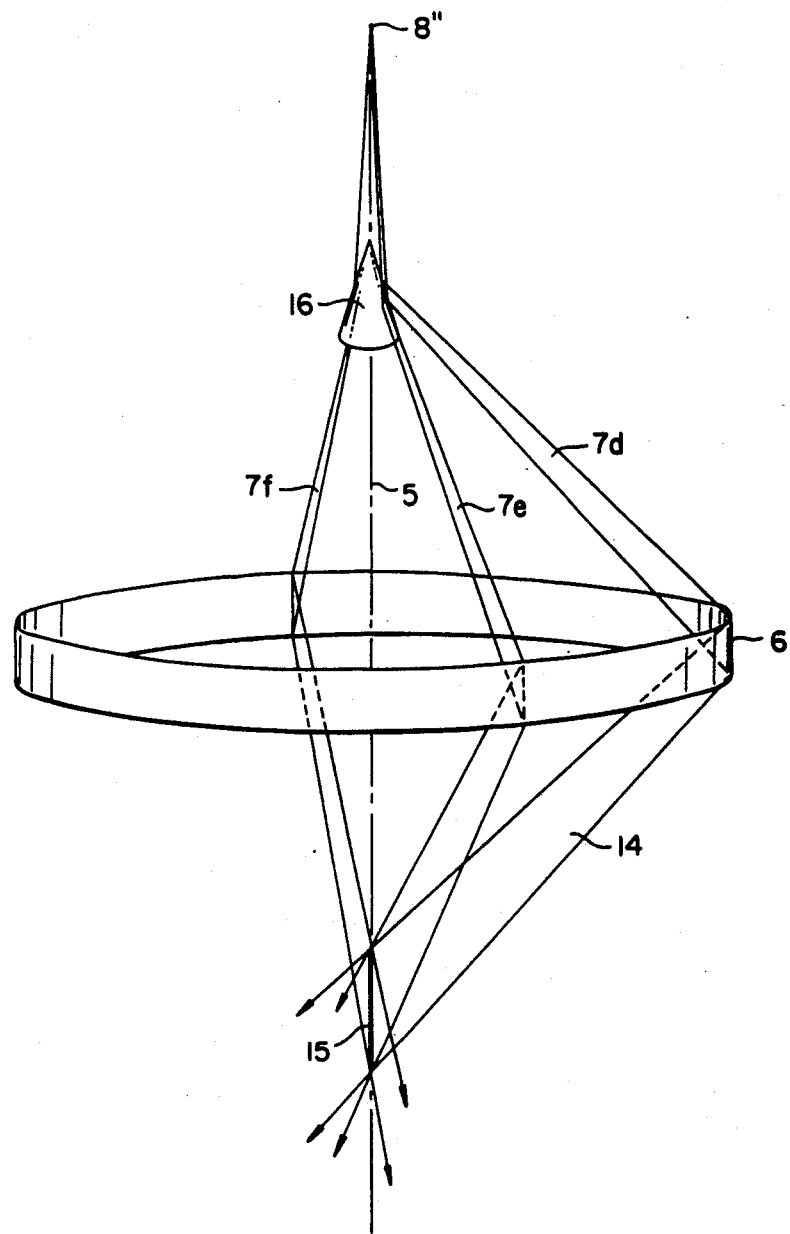
FIG._4.

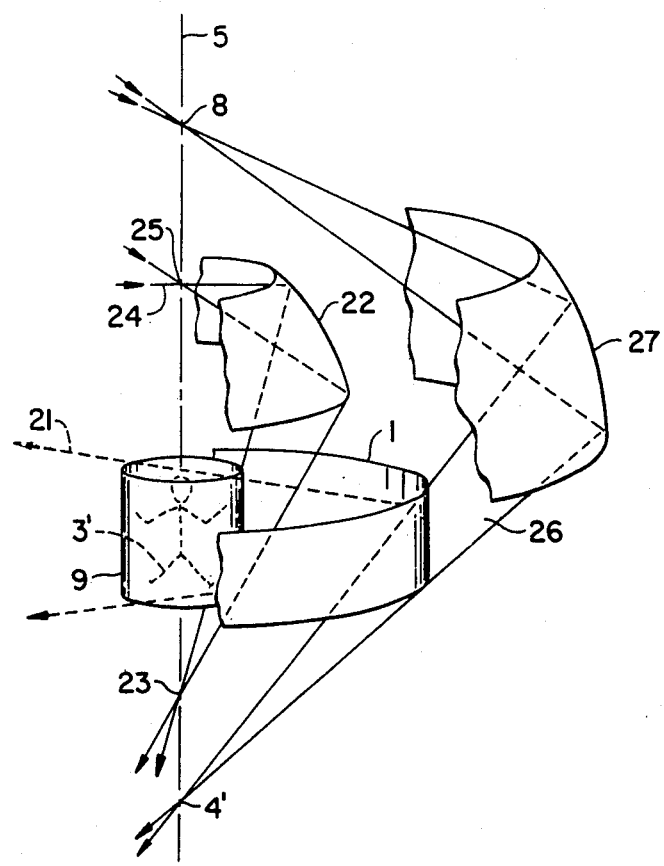
FIG._6.
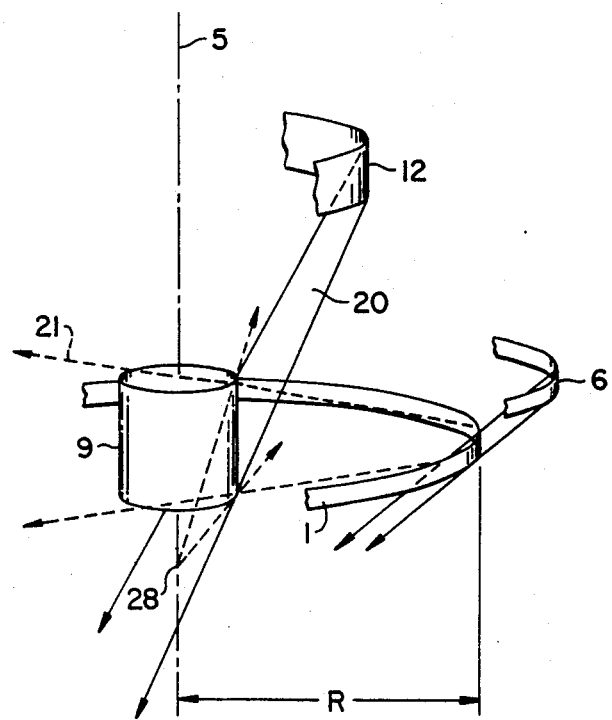
FIG._7.

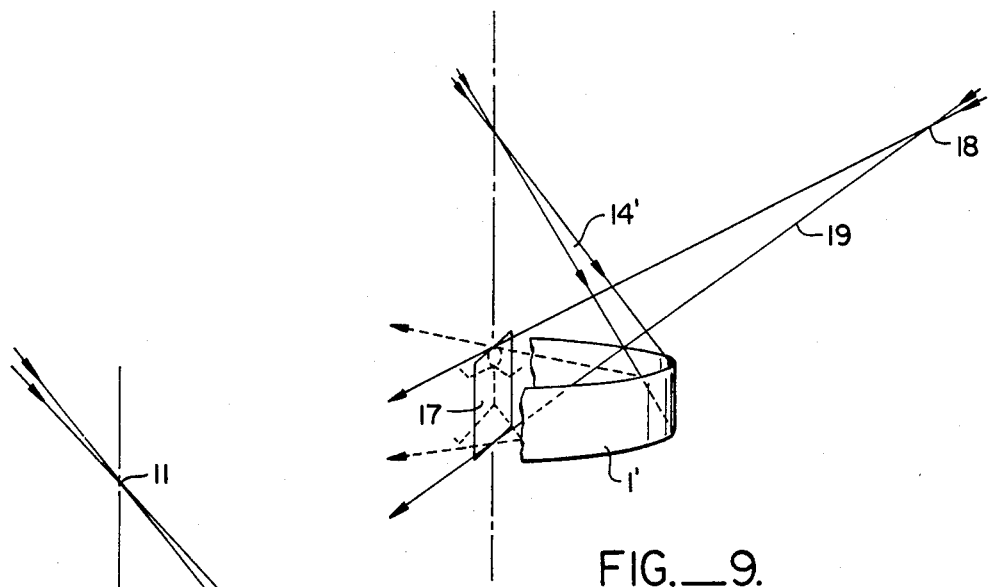
FIG._9.
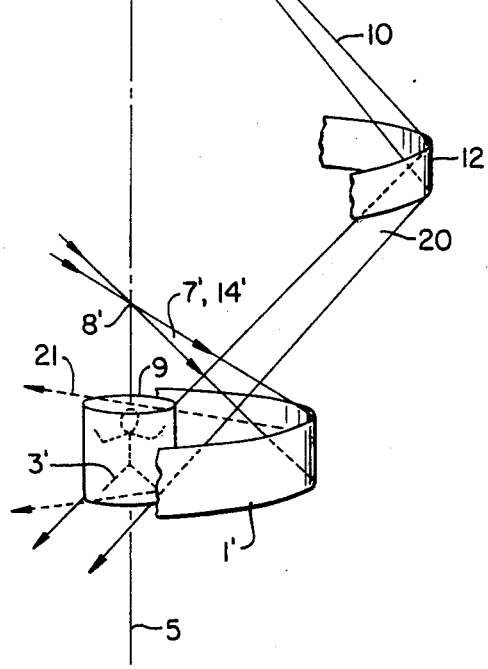
FIG._8.
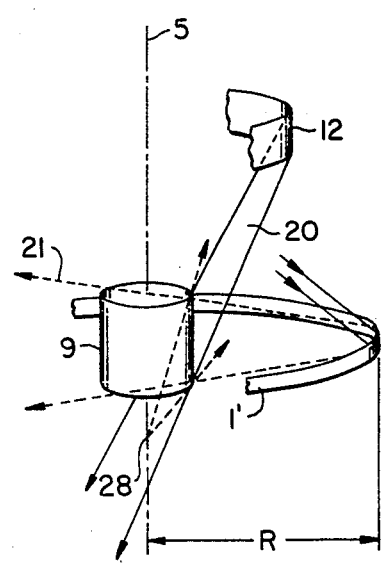
FIG._10.

HOLOGRAMS CREATED FROM CYLINDRICAL HOLOGRAM MASTERS

CROSS-REFERENCE TO RELATED APPLICATIONS

This application is a continuation-in-part of U.S. Ser. No. 875,172, filed Feb. 6, 1978, now abandoned, and U.S. Ser. No. 922,228, filed July 5, 1978, now abandoned.

BACKGROUND OF THE INVENTION

This invention relates generally in the field of holography and is specifically directed, although not restricted, to a method of producing wide angle white light viewable holograms.

A simple form of classical holography requires that one record the coherent light reflected from a three-dimensional object. If there is insufficient light available from the laser source which illuminates the object, or if the object moves by even the slightest amount during the recording, then this method of holography is not useful. A technique is described in *Scientific American*, Oct. 1976, pages 80 to 95, in which a laser light source is not required. Furthermore with this method, known as composite holography (sometimes referred to as multiplex or lenticular holography and herein referred to as conventional composite holography) the restriction on object motion is not severe. With composite holography, the hologram is synthesized from a multiplicity of conventional incoherent light photographs each captured by a camera positioned at a slightly different azimuthal viewing angle. Typically 1080 such photographs are used, each recorded at angles displaced from each other by one-third of a degree. Each photograph is illuminated with coherent laser light and is used as the object in a tall but narrow elemental hologram. These elemental holograms are placed side by side in an order which corresponds to the viewing angle of their respective photographs. The hologram can be reconstructed using white light. The image lacks vertical parallax but retains the visual effects of the three dimensions if a large enough number of photographs are used, since horizontal parallax is retained. If the object is photographed throughout angles surrounding the object, the resulting hologram is a drum which surrounds the virtual image. Images reconstructed from these holograms contain unavoidable distortions. These distortions come about for the following reason. One can regard the construction of composite holograms as an attempt to capture and reconstruct views of the object (albeit demagnified in most cases) which are seen by the camera in the photography step. This being the case, an observer must observe the image through a rather short cylinder, the diameter of which represents the horizontal trajectory of the camera. The image viewed from a composite hologram is undistorted only when this hologram is very short in comparison with the image height, and from which the image rays are greatly diverging. Such a procedure results unfortunately in a hologram whose imagery is unacceptable for most viewing conditions. Conventional composite holograms are in fact quite tall (equal approximately to the image height) a necessity since they must simulate a vertical window of adequate size. Failure to create holograms so short that they eliminate distortions is not particularly disastrous for conventional composite holograms which are viewed from large distances. But it accounts for an inherent image distortion which is quite evident when viewing from locations close to the hologram surface.

The optical system used to convert the photographic transparencies to the hologram, as well as those systems used for the original photography, use lens elements with practical limitations (F numbers $>1$) and because of this, the image is prohibited from occuping a space within the cylinder which is greater than half the cylinder diameter. Furthermore, composite hologram configurations other than cylindrical, such as flat plates, cannot be generated with this system.

Cylindrical holograms of stationary objects can be formed using classical methods by illuminating a stationary object with coherent light and surrounding the object with undeveloped photographic film. The film is exposed with the object reflected light and with a suitable reference. The images in such holograms again cannot occupy a large volume of the resulting drum because of the physical constraints in positioning this construction reference beam.

A method of copying original holograms, which has been frequently used in the past, is similar to that discussed by Rotz and Freisem in Applied Physics Letters, Vol. 8, No. 6, page 146 (March 1966). The implementation of the method for copying the cylindrical holograms requires that one cut the cylinder so that it may be located as a flat plate, and then reilluminate it with a suitably converging, diverging, or plane reference wave. The diffracted image wave and a suitable reference wave are intercepted at some distance, perhaps a very small distance from this original hologram, by a second holographic surface on which is constructed a second hologram. While this procedure seems like an obvious method of creating copy cylindrical holograms, it is in fact limited in that the viewing angle is reduced rather than increased in the copy image. Cylindrical holograms copied by the method create images which occupy no greater a percentage of the cylindrical volume than that of the original.

A second and related method of copying holograms is a contact copy method described by Brumm in Applied Optics, Vol. 5, No. 12, page 1946 (Dec. 1966). This method is commonly used for copying composite cylindrical holograms. The copy is created with a second film placed very close to the original such that the construction reference wave for the second hologram is the undiffracted portion of the original hologram reillumination wave. However, this wave is unavoidably contaminated on passing through this first hologram and contributes to noise in the image of the second hologram. The object wave for the second hologram is the image diffracted from the first. Thus, one has no method of optimizing the reference to object beam ratio in the second hologram construction. The image in the copy retains the limited viewing angles of the original.

Both of these copy methods allow one, in principle, to create copies with a single exposure, rather than with the multiple (for example 1080) exposures required for the composite original. This single exposure requirement is a necessity if efficient production is to be maintained.

It is an object of the present invention to construct cylindrical holograms whose images occupy the entire volume within the cylinder.

It is another object of this invention to construct second holograms from original cylindrical holograms whose configurations are other than cylindrical, such as flat plates, and which retain the large horizontal viewing angles of the original cylindrical holograms.

It is a further object of this invention to construct second holograms from cylindrical originals in which the holographic recording surface or volume lies within the image space.

It is yet another object of this invention to construct in a single laser exposure, copy holograms from original cylindrical holograms which contain distortion free images.

SUMMARY OF THE INVENTION

The objects of this invention are accomplished by using reflectors which surround original cylindrical holograms and from which is reflected a reconstruction reference wave. Used in this manner, a real image is created within the original cylinder. A second hologram is then constructed within or enclosing this real image space. The reference wave for this second hologram may also be created using a surrounding reflector.

The well known methods of hologram copying are not used as a part of this invention. The goals of this disclosure are achieved by recreating real images within the original cylindrical drum holograms in an unusual manner, and of providing adequate reference waves for the copy holograms using unconventional optics.

While the present invention is defined in the appended claims, the underlying principles of the invention, may be better understood with the reference to the following detailed description taken in conjunction with the following drawings.

BRIEF DESCRIPTION OF THE DRAWINGS

FIG. 1 depicts a method of reconstructing the image in a conventional cylindrical hologram;

FIG. 2 shows a method in which a small cylindrical hologram is made from this original hologram;

FIG. 3 shows a method of creating a reconstruction wave for the original hologram using a rod;

FIG. 4 shows a method of creating a reconstruction wave for the original hologram using a cone;

FIG. 5 depicts a method of making a flat hologram from an original cylindrical hologram;

FIG. 6 shows another method of constructing a cylindrical hologram that is similar to that of FIG. 2 but with different reference waves;

FIG. 7 shows a method of making a copy cylindrical hologram which avoids image distortion, and FIGS. 8, 9 and 10 show the use of a reflective hologram in the technique of the present invention.

DETAILED DESCRIPTION OF A PREFERRED EMBODIMENT

Referring to FIG. 1, the cylindrical hologram 1 may be formed as a multiplex or composite hologram from a great many photographic transparencies, each being used to construct one of the elemental holograms, 2a, 2b, etc. Alternatively, it may be formed as a classical hologram from a photographic film or other photo sensitive surface which originally surrounded a laser illuminated object whose image 3 is shown in FIG. 1. A preferred manner of reconstructing image 3 is to illuminate the entire hologram 1 with light which emanates from the reference source 4 which is essentially on the cylinder axis 5.

A method of creating a real image 3' within the volume of the original hologram 1 is shown in FIG. 6. With this method a reillumination wave 26 passing through the hologram 1 is caused to come to focus at a point 4' which is located reasonably close to the axial reconstruction reference point location 4 of FIG. 1. It may seem difficult to create a converging reference wave of the required dimensions. However, one way of doing this is to reflect from the surface of a suitable spherical, paraboloidal or ellipsoidal (as in FIG. 6) reflector 27 a wave which has first passed through the focal point 8 located on the hologram cylinder axis 5. The reflector axis is also coincident or near coincident with the axis 5.

A second hologram can be constructed within the volume of the hologram 1 of FIG. 6, and which uses as its object, those image rays 21 diffracted from the hologram 1 into the image 3'. One example of a second hologram surface is the cylinder 9 whose axis is coincident with that of the hologram 1. This hologram can contain an image which occupies its entire inner volume. Furthermore, such a hologram can be constructed with a single laser exposure. A method of generating a construction reference wave for hologram 9 employs a spherical, paraboloidal, or ellipsoidal reflector in a manner similar to that used for the construction reference of hologram 1. An illumination beam 24 is caused to come to focus at the point 25 and to fall upon the surface of a spherical, paraboloidal, or ellipsoidal reflector 22, whose axis is coincident with the axis 5. The light reflected from this reflector passes through the copy hologram 9 and comes to focus as the point 23 which is also located on the axis 5. The use of such a reference wave allows the copied hologram to be reconstructed with a light source like that shown in FIG. 1, and which contains an image which is no more distorted than is the image of the original hologram.

With the foregoing method, one is compelled to use complicated reflectors which are larger than the original hologram. If this original composite hologram is very large, the use of such reflectors is impractical. In FIGS. 2 through 5 are shown systems in which these complex reflectors are reduced to simple cylindrical shapes. In FIG. 2, the image 3' is reconstructed within the original hologram 1 by illuminating the cylinder 6, which is centered on the axis 5 and whose inside surface is reflective, with coherent radiation 7 which is first focused through the point 8 located essentially on the cylinder axis 5. The wave 7 is caused to pass through the original hologram 1 after it is reflected from the reflector 6, thereby creating image rays 21 which are diffracted from the original hologram 1 and which come to focus as the image 3'. A photographic film cylinder 9 is placed around this real image with its axis coincident with the axial line 5. FIG. 2 shows one method in which a reference wave appropriate for the construction of a hologram on the cylinder 9 is constructed. Light rays 10 which are coherent with the hologram illumination rays 7 are focused through the point 11, which is located essentially on the axis 5, reflected from the cylindrical reflector 12, and caused to pass through the second holographic film surface 9. A hologram constructed on the surface 9 may be reilluminated with waves which emanate from a point located on the axis 5 below the cylinder 9. If the image 3' reconstructed from the original hologram occupied most of the volume within the cylinder 9 during the construction of the hologram on the surface 9, then the final reconstructed image of the hologram on this surface will occupy most of the volume within that cylinder.

It should be apparent that combination systems are possible. For example, one can reconstruct the hologram 1 using the cylindrical reflector 6 of FIG. 2, while using the spherical reflector 22 of FIG. 6 as an element in the construction reference beam for the hologram 9.

Light focused through the point 8 in FIG. 2 is inefficiently used because a great portion of the illumination is not intercepted and reflected by the reflector 6. A more efficient use is made of the available light by using the system shown in FIG. 3. The source radiation is focused through the point 8' and the light passing through the point 8' is allowed to fall upon the reflective or refractive rod 13. This rod is positioned such that a substantial portion of the wave, three portions of which are shown as 7a, 7b and 7c, which is reflected from its inner or outer surface or refracted through it, falls upon the reflective cylinder 6, from whence it is reflected as the wave 14 which comes to focus as the line 15 located on or near the axis 5.

An alternative method for modifying the illumination beam 7 in order to increase the efficient use of the light, is shown in FIG. 4. The source light is focused through the point 8" located on the axis 5 and is allowed to fall upon a reflective or refractive cone 16. The cone 16 is oriented with its axis on the system axis 5, and is appropriately selected so that a substantial portion of the wave reflected from its surface or transmitted through it, shown as 7d, 7e and 7f, falls upon the reflective cylinder 6 and comes to focus as the line 15 located on or near the axis 5.

With both arrangements shown in FIGS. 3 and 4, if the divergence of the light prior to passing through the focal points 8' or 8" is optimumly selected, most of the light will be used as the illumination wave 14 which passes through the hologram 1 of FIG. 2. These modifications which increase the light use efficiency can also be used with the construction reference waves 10 for the copy hologram.

While the previous discussion has been confined to the construction of a cylindrical hologram which can be illuminated with a small source on its cylindrical axis, the techniques are not confined to this configuration. The second or copy hologram may be of any shape desired, and a specific example is shown in FIG. 5. In this figure, a flat hologram 17 is shown as it is constructed within the image space. When such a hologram is constructed, portions of its image are real, while other portions are virtual. The image subtends the holographic surface. In FIG. 5, the original cylindrical hologram is constructed much as shown in FIG. 2. However, the reference wave is different. Light is focused through the point 18 and forms the wave 19, which then passes through the plate 17 without further beam modification. Other reference wave configurations common to holography may also be used. Sometimes it may even be useful to use actual images generated by the original cylinder, rather than the pseudoscopic images. The use of non-pseudoscopic images may be preferred in a system similar to that of FIG. 5, since the hologram created as 17 may be reilluminated with a diverging reference which mimics the wave 19 and which is viewed from the left in the figure.

A conventionally constructed cylindrical multiplex or composite hologram may be used as the original hologram shown as 1 in the figures. A conventionally constructed multiplex hologram is meant to represent those holograms which are constructed to be viewed directly using a point source on the cylinder axis as is shown in FIG. 1. While the use of such composite holograms may be acceptable, it retains in the reconstructed images of the copy or second holograms those unavoidable distortions which existed in the original and which were discussed previously. In fact, if the divergence of the reconstruction reference beam 14 for the original hologram is different than that intended for optimum imagery, then the vertical image dimension of the drum 9 might be even more severely distorted than the original. Such a situation might arise, for example, if the reconstruction wave is diverging, as in FIG. 2, while the optimum is a wave converging to the point 4 as in FIG. 1. The resulting image 3' will be too tall if it is close to the surface of the drum 9. For the case of the flat hologram of FIG. 5, such a distortion will be present if the original hologram was meant to be reconstructed with a point source on the axis. Furthermore, the use of conventional composite holograms or classical holograms with the system of FIG. 2, can lead to images which contain chromatic spread; the images may be red at the top, green in the middle and blue at the bottom, for example. This can happen because the construction and reconstruction reference beam divergences for the second or copy hologram differ by degrees which are less than optimum.

A system of the type discussed in the following is appropriately designed to create copy hologram images which are distortion free, and which contain no chromatic spread for a preselected viewing distance. With this system, an original composite hologram is constructed which is much shorter than the conventional type, and which by itself creates images which are totally unacceptable for normal viewing. It is not apparent that good quality images can be recovered from such holograms. Because these original holograms are so short, there is a tremendous advantage in their use in the construction of large size copies, because the previously discussed alternative methods would require the construction of large composite masters. The reconstruction beam reflectors (6 in FIG. 2 and 27 in FIG. 6) are likewise short and therefore easy to fabricate.

The desired hologram image is often smaller than the originally photographed object by some desired demagnification ratio. It can be shown with reference to FIG. 7, that if distortion is to be avoided, the distance R between the composite hologram surface 1 and the image centroid on the axis 5 must be equal to the distance between the original camera aperture and the object centroid multiplied by this ratio. Also, the hologram height should be quite small so that the camera vertical perspective is maintained in the reconstructed image. The major problem with this arrangement is that the viewer must be very near to the optimum viewing position which is close to the hologram surface. His eye must be at the correct elevation. The resulting horizontal slit hologram is much too short to be useful at any other viewing position. It must be remembered though, that for the processes discussed in this disclosure, the hologram 1 is not used for direct viewing. A short original hologram is not only tolerable for the copy process, it is better than a conventional tall original. It is fortuitous that such a short hologram is also ideal for the copy scheme shown in FIG. 2 for reasons having to do with chromatic spread.

By altering the divergence of the reference beam in the construction process of the hologram 1, one can guarantee that the divergence of the image rays 21 is just right to eliminate distortion in the image close to the surface of the copy hologram 9 regardless of the viewing distance. It remains then to select the appropriate divergence for the construction reference 20 of the copy hologram 9, such that upon playback with the appropriate reconstruction reference, such as a point source 28 on axis 5 for the drum shown in FIG. 7, the image of the hologram 9 will not be plagued with chromatic spread. If these references are not matched to the divergence of rays 21, the divergence or the convergence of the final image rays may be so grossly inappropriate that observation of the image is impossible from all but a few positions. Ideally this match is achieved for some preselected viewing distance at which chromatic spread is to be minimized. An example is one in which the divergence of rays 20 is selected so that the image rays diffracted from the final hologram 9 in its reconstruction process are vertically parallel to each other (collimated). Then, the image viewed from infinity contains no chromatic spread.

It is difficult to create a converging reference wave 20 from a cylindrical reflector such as that shown in FIG. 2, which would match the eventual playback reference of hologram 9 (such as the point source 28 in FIG. 7). Because of this, chromatic spread is reduced only if the image rays 21 are diverging, which in turn means that hologram 1 must be short. Such a short hologram is of course ideal for the minimization of distortion also.

Alternatively it may be argued that since the image rays 21 for the construction of hologram 9 in FIG. 7 are strongly divergent, and since the final reconstruction reference source for the cylindrical configuration of hologram 9 is an on-axis point, a cylindrical reflector 12 in the construction reference is better than the previously discussed spherical and other reflectors.

The specific embodiments described with respect to FIGS. 1-7 utilize a transmissive hologram 1 as the master from which the cylindrical or flat copy hologram is constructed. Alternatively, as illustrated in FIGS. 8, 9 and 10, the master hologram may be reflective. FIGS. 8, 9 and 10 are, respectively, modifications of FIGS. 2, 5 and 7, with unmodified components and beams being identified by the same reference numbers and those elements and beams that are modified being given the same reference number with a prime (') added thereto.

Each of the master holograms 1' of FIGS. 8, 9 and 10 can be made to be reflective by any of a number of existing techniques. One technique is to first make from object transparencies a master hologram on photo-resist or thermo-plastic materials. The resulting surface relief hologram may, according to one technique, be coated with a thin, reflective layer, such as by vacuum depositing a thin layer of aluminum. The reflective layer then conforms to the surface relief of the hologram which contains the optical information and a beam reflected from it thus is capable of reconstructing an image of the information recorded on the hologram. Alternatively to applying such a coating, a casting of the original photoresist or thermo-plastic hologram may be obtained and then metalized. Yet another method is one in which the photo-resist or thermo-plastic surface relief hologram is used to make a solid metal reflective hologram by electrolysis and electrolytic deposition methods, such as known nickel plating techniques.

The advantage of utilizing a reflective hologram 1' in place of a transmissive hologram 1 is that it eliminates the necessity of a reflector, such as the reflector 6 of FIG. 2, that is separate from the hologram itself. The reflector and the hologram are combined into one structure.

While the invention has been described in somewhat general terms without reference to a specific detailed and complicated mathematical analysis, and while the invention has been illustrated in specific embodiments, it is not intended that the invention be limited to the specific embodiments illustrated. It is also considered desirable that the mathematical analysis be eliminated, inasmuch as it adds nothing to the understanding of the basic principles underlying this invention and may tend to confuse those not intimately familiar with mathematics on the level required for such an analysis.

I claim:

1. A method of producing a second hologram from at least a portion of an original transmissive cylindrical hologram comprising the steps of:

illuminating said at least a portion of the original cylindrical hologram by passing therethrough only once a coherent illumination wave which comes to focus as a line located substantially on a virtual axis of the cylindrical hologram, placing within the cylinder an image-receiving surface to intercept real image rays diffracted from said original hologram, directing onto said image-receiving surface, at a finite angle with respect to the real image rays, a reference wave which is coherent with the illumination beam of the original hologram, thereby producing a pattern of interference fringes on the image-receiving surface, and detecting and recording as a second hologram said interference fringes.

2. A method according to claim 1 in which the wave illuminating the original cylindrical hologram is created by a method comprising the steps of:

placing a cylinder with an inner reflective surface in a position such that its axis is coincident with that of said original cylindrical hologram, said reflective cylinder having a diameter which is greater than that of the original cylindrical hologram, and directing a beam of coherent illumination onto said reflective surface, and at such an angle with respect to said reflective surface that the reflected rays pass through the original cylindrical hologram.

3. A method according to claim 2 in which the beam of coherent illumination is further formed prior to its falling upon the surface of the reflective cylinder, by a method comprising the steps of:

focusing a beam of coherent radiation through a point located essentially on the axis of the aforementioned cylindrical reflector, and intercepting the illumination wave after it passes through said point focus by the aforementioned cylindrical reflective surface, thereby creating a beam which comes to focus substantially as a line on the cylinder axis.

4. A method of producing hologram from at least a portion of an original cylindrical hologram comprising the steps of:

illuminating said at least a portion of the original cylindrical hologram with a coherent illumination wave which comes to focus as a line located substantially on the virtural axis of the cylinder, said illumination wave being formed by a method comprising the steps of:

placing a cylinder with an inner reflective surface in a position such that its axis is coincident with that of said original cylindrical hologram, said reflective cylinder having a diameter which is greater than that of the original cylindrical hologram, and directing a beam of coherent illumination onto said reflective surface, and at such an angle with respect to said reflective surface that the reflected rays pass through the original cylindrical hologram, directing a beam of coherent illumination through a region of the axis of the aforementioned cylindrical reflector, and placing essentially on said cylinder axis a transmissive or reflective rod whose axis is coincident with the cylinder axis and from which is reflected or refracted a substantial portion of said coherent illumination beam and which further causes the reflected or refracted beam to fall upon a substantial portion of the aforementioned cylindrical reflector, thereby creating a beam which comes to focus substantially as a line on the cylinder axis, and placing within the cylinder an image-receiving surface to intercept the real image rays diffracted from said original hologram, directing onto said image-receiving surface, at a finite angle with respect to the image rays, a reference wave which is coherent with the illumination beam of the original hologram, thereby producing a pattern of interference fringes on the image-receiving surface, and detecting and recording as a second hologram said interference fringes.

5. A method of producing a second hologram from at least a portion of an original cylindrical hologram comprising the steps of:

illuminating said at least a portion of the original cylindrical hologram with a coherent illumination wave which comes to focus as a line located substantially on the virtural axis of the cylinder, said illumination wave being formed by a method comprising the steps of:

placing a cylinder with an inner reflective surface in a position such that its axis is coincident with that of said original cylindrical hologram, said reflective cylinder having a diameter which is greater than that of the original cylindrical hologram, directing a beam of coherent illumination onto said reflective surface, and at such an angle with respect to said reflective surface that the reflected rays pass through the original cylindrical hologram, directing a beam of coherent illumination along said aforementioned cylinder axis, and placing on said cylinder axis a reflective or transmissive cone whose axis is coincident with the cylinder axis and from which is reflected or refracted a substantial portion of said coherent illumination beam, and which further causes the reflected or refracted beam to fall upon a substantial portion of the aforementioned cylindrical reflector, thereby creating a beam which comes to focus substantially as a line on the cylinder axis, and placing within the cylinder an image-receiving surface to intercept the real image rays diffracted from said original hologram, directing onto said image-receiving surface, at a finite angle with respect to the image rays, a reference wave which is coherent with the illumination beam of the original hologram, thereby producing a pattern of interference fringes on the image-receiving surface, and detecting and recording as a second hologram said interference fringes.

6. A method of producing a second hologram from at least a portion of an original cylindrical hologram comprising the steps of:

illuminating said at least a portion of the original cylindrical hologram with a coherent illumination wave which comes to focus as a line located substantially on the virtual axis of the cylinder, placing within the cylinder an image-receiving surface to intercept the real image rays diffracted from said original hologram, said image-receiving surface being substantially cylindrical and concentric with the original hologram, directing onto said image-receiving surface, at a finite angle with respect to the image rays, a reference wave which is coherent with the illumination beam of the original hologram, thereby producing a pattern of interference fringes on the image-receiving surface, and detecting and recording as a second hologram said interference fringes.

7. A method according to claim 1 in which the image-receiving surface is substantially planar.

8. A method of producing a second hologram from at least a portion of an original cylindrical hologram comprising the steps of:

illuminating said at least a portion of the original cylindrical hologram with a coherent illumination wave which comes to focus as a line located substantially on the virtual axis of the cylinder, placing within the cylinder an image-receiving surface to intercept the real image rays diffracted from said original hologram, directing onto said image-receiving surface, at a finite angle with respect to the image rays, a reference wave which is coherent with the illumination beam of the original hologram, thereby producing a pattern of interference fringes on the image-receiving surface, the reference wave being created by a method comprising the steps of:

placing a cylinder with an inner reflective surface in a position such that its axis is coincident with or close to coincidence with the original cylindrical hologram axis, and directing a coherent reference beam onto the inner surface of said reflective cylinder, and at an angle such that the reflected rays pass through said aforementioned image-receiving surface and come to focus as a line which is parallel to the axis of the original cylindrical hologram, and detecting and recording as a second hologram said interference fringes.

9. A method according to claim 8 in which the reference beam is further formed prior to its falling upon the surface of the reflective cylinder, by a method comprising the steps of:

focusing a beam of coherent radiation through a point located substantially on the axis of said cylindrical reflector, intercepting the illumination wave after it passes through said point focus by the aforementioned cylindrical reflection thereby creating a reference beam which comes to focus substantially as a line which is parallel to the cylinder axis.

10. A method according to claim 8 in which the reference beam is further formed prior to its falling upon the surface of the reflective cylinder, by a method comprising the steps of:
directing a beam of coherent illumination through a region of the axis of the aforementioned cylindrical reflector, and
placing on, or close to, said cylinder axis a transmissive or reflective rod whose axis is parallel to the cylinder axis and from which is reflected or refracted a substantial portion of said coherent illumination beam and which further causes the reflected or refracted beam to fall upon a substantial portion of the said cylindrical reflector, thereby creating a reference beam which comes to focus substantially as a line which is parallel to the cylinder axis.

11. A method according to claim 8 in which the reference beam is further formed prior to its falling upon the surface of the reflective cylinder, by a method comprising the steps of:
directing a beam of coherent radiation in a direction parallel to the cylinder axis, and
placing on or close to the cylinder axis a reflective or transmissive cone whose axis is coincident with the cylinder axis and from which is reflected or refracted a substantial portion of said coherent illumination and which further causes the reflected or refracted beam to fall upon a substantial portion of the aforementioned cylindrical reflector, thereby creating a reference beam which comes to focus substantially as a line which is parallel to the cylinder axis.

12. A method of producing a second hologram from at least a portion of an original cylindrical hologram comprising the steps of:
illuminating said at least a portion of the original cylindrical hologram with a coherent illumination wave which comes to focus as a line located substantially on the virtual axis of the cylinder,
placing within the cylinder an image-receiving surface to intercept the real image rays diffracted from said original hologram,
directing onto said image-receiving surface, at a finite angle with respect to the image rays, a reference beam which is coherent with the illumination beam of the original hologram, thereby producing a pattern of interference fringes on the image-receiving surface, the reference beam being created by directing a beam of coherent illumination onto a reflective surface, said reflective surface being of such a shape that the reflected rays come to focus as a point located substantially on the axis of the original cylindrical hologram after passing through said aforementioned image-receiving surface, and
detecting and recording as a second hologram said interference fringes.

13. A method according to claim 12 in which said reflective surface is substantially a spherical surface.

14. A method according to claim 13 in which said reflective surface is substantially a paraboloidal surface.

15. A method according to claim 12 in which said reflective surface is substantially an ellipsoidal surface.

16. A method of producing a second hologram from at least a portion of an original cylindrical hologram comprising the steps of:

illuminating said at least a portion of the original cylindrical hologram with a coherent illumination wave which comes to focus as a point located substantially on a virtual axis of the cylinder,
placing within the cylinder an image-receiving surface to intercept real image rays diffracted from said original hologram,
directing onto said image-receiving surface at a finite angle with respect to the real image rays, a reference wave which is coherent with the illumination beam of the original hologram thereby producing a pattern of interference fringes on the image-receiving surface, and
detecting and recording as a second hologram the said interference fringes.

17. A method according to claim 16 in which the wave illuminating the original cylindrical hologram is created by directing a beam of coherent illumination onto a reflective surface, said reflective surface being of such a shape that the reflected rays come to focus as a point located essentially on the axis of said original cylindrical hologram after passing through said cylindrical hologram.

18. A method according to claim 17 in which said reflective surface is essentially a spherical surface.

19. A method according to claim 17 in which said reflective surface is essentially a paraboloidal surface.

20. A method according to claim 17 in which said reflective surface is essentially an ellipsoidal surface.

21. A method according to claim 16 in which the image-receiving surface is essentially cylindrical and concentric with the original hologram.

22. A method according to claim 16 in which the image-receiving surface is essentially planar.

23. A method according to claim 16 in which the reference wave is created by a method comprising the steps of:
placing a cylinder with an inner reflective surface in a position such that its axis is coincident with, or close to coincidence with the original cylindrical hologram axis, and
directing a coherent reference beam onto the inner surface of said reflective cylinder at an angle such that the reflected rays pass through said aforementioned image receiving surface and come to focus as a line which is parallel to the axis of the original cylindrical hologram.

24. A method according to claim 23 in which the reference beam is further formed prior to its falling upon the surface of the reflective cylinder, by a method comprising the steps of:
focusing a beam of coherent radiation through a point, and
intercepting the illumination wave after it passes through said point focus by the aforementioned cylindrical reflector thereby creating a reference beam which comes to focus essentially as a line which is parallel to the cylinder axis.

25. A method according to claim 23 in which the reference beam is further formed prior to its falling upon the surface of the reflective cylinder, by a method comprising the steps of:
directing a beam of coherent illumination through a region of the axis of the aforementioned cylindrical reflector, and
placing on, or close to, said cylinder axis a transmissive or reflective rod whose axis is parallel to the cylinder axis and from which is reflected or refracted a substantial portion of said coherent illumination beam and which further causes the reflected or refracted beam to fall upon a substantial portion of the said cylindrical reflector, thereby creating a reference beam which comes to focus essentially as a line which is parallel to the cylinder axis.

26. A method according to claim 23 in which the reference beam is further formed prior to its falling upon the surface of the reflective cylinder, by a method comprising the steps of:
directing a beam of coherent radiation in a direction parallel to the cylinder axis, and
placing on or close to the cylinder axis a reflective or transmissive cone whose axis is coincident with the cylinder axis and from which is reflected or refracted a substantial portion of said coherent illumination wave and which further causes the reflected or refracted beam to fall upon a substantial portion of the aforementioned cylindrical reflector, thereby creating a reference beam which comes to focus essentially as a line which is parallel to the cylinder axis.

27. A method according to claim 16 in which the reference wave is created by directing a beam of coherent illumination onto a reflective surface, said reflective surface being of such a shape that the reflected rays come to focus as a point located substantially on the axis of the original cylindrical hologram after passing through said aforementioned image-receiving surface.

28. A method according to claim 27 in which said reflective surface is substantially a spherical surface.

29. A method according to claim 27 in which said reflective surface is substantially a paraboloidal surface.

30. A method according to claim 27 in which said reflective surface is substantially an ellipsoidal surface.

31. A method according to claim 16 wherein the dimension of the original cylindrical hologram in the direction of said axis is significantly less than the same dimension of said image-receiving surface, thereby to produce the recorded second hologram with a significantly greater height than that of the original cylindrical hologram.

32. A method according to claim 16 wherein said original cylindrical hologram is reflective.

33. A method according to claim 16 wherein said original cylindrical hologram is transmissive.

34. A method according to claim 16 wherein said original cylindrical hologram extends a full 360 degrees, and wherein the step of illuminating the original hologram includes illuminating the entire cylinder at one time.

35. A method according to any of claims 2, 4, 5, 8, or 12 wherein the image-receiving surface is at least a portion of a cylinder having an axis substantially coincident with the original hologram axis.

36. A method according to any of claims 2, 3, 4, or 5 wherein the image-receiving surface is substantially planar.

37. A cylindrical hologram made by the process of either of claims 6 or 16.

38. A flat hologram made by the process of either of claims 7 or 22.

39. A non-contact method of producing a second substantially cylindrically shaped hologram from a first substantially cylindrically shaped hologram, comprising the steps of:
illuminating at least a portion of the first hologram with coherent electromagnetic radiation, thereby diffracting or refracting a portion of said illuminating radiation into an image carrying beam,
positioning the second hologram detector in the path of said image carrying beam within the first hologram and concentric therewith, the second hologram having a radius that is significantly less than the radius of the first hologram, and
directing onto said second hologram detector reference radiation that is mutually coherent with the illuminating radiation, said reference radiation striking the detector at a finite angle with the image carrying beam and without passing through the first hologram.

40. A non-contract method of producing a substantially planar hologram from a transmissive substantially cylindrically shaped hologram, comprising the steps of:
illuminating at least a portion of the cylindrical hologram by passing therethrough only once coherent electromagnetic radiation, thereby diffracting or refracting a portion of said illuminating radiation into an image carrying beam,
positioning a substantially planar hologram detector in the path of said image carrying beam within the cylindrical hologram, and
directing onto said planar hologram detector reference radiation that is mutually coherent with the illuminating radiation, said reference radiation striking the detector at a finite angle with the image carrying beam.

41. The method according to either of claims 39 or 40 wherein the step of illuminating the cylindrically shaped hologram includes controlling the curvature of the radiation in a manner that its portion that is not diffracted or refracted comes to a substantial point focus located substantially coincident with an axis of said cylindrically shaped hologram outside of its interior volume.

42. The method according to either of claims 39 or 40 wherein the step of illuminating the cylindrically shaped hologram includes controlling the curvature of the radiation in a manner that its portion that is not diffracted or refracted comes to a substantial line focus located substantially coincident with an axis of said cylindrically shaped hologram outside of its interior volume.

43. The method according to either of claims 37 or 40 wherein the cylindrically shaped hologram extends a full 360 degrees, and wherein the step of illuminating the cylindrical hologram includes illuminating the entire cylinder at one time.

44. The method according to either of claims 39 or 40 wherein the cylindrically shaped hologram is of a transmissive type and wherein the step of illuminating the hologram includes focusing the coherent radiation through a point substantially on an axis of the cylindrical hologram and thence to a cylindrical reflector having an axis substantially coincident with that of the cylindrical hologram, said reflector being positioned to direct its reflected radiation through the hologram.

45. The method according to either of claims 39 or 40 wherein the cylindrically shaped hologram is of a reflective type and wherein the step of illuminating the hologram includes focusing the coherent radiation through a point substantially on an axis of the cylindrical hologram directly onto the cylindrical hologram.

46. The method according to either of claims 39 or 40 wherein the hologram detector has a height that is substantially more than that of the cylindrical hologram in a direction along its axis.

47. The method according to claim 39 wherein the step of directing reference radiation onto the second hologram detector includes focusing the reference radiation through a substantial point along the axis of the cylindrical hologram outside of its interior volume and thence to a cylindrical reflector having an axis substantially coincident with that of the cylindrical hologram, said reflector being positioned to direct its reflected radiation onto the detector.

48. A cylindrical hologram made by the process of claim 39.

49. A planar hologram made by the process of claim 40.

50. A method of producing a second hologram from at least a portion of an original cylindrical hologram comprising the steps of:

illuminating said at least a portion of the original cylindrical hologram with a coherent illumination wave which comes to focus as a line located substantially on the virtural axis of the cylinder, placing within the cylinder an image-receiving surface to intercept the real image rays diffracted from said original hologram, wherein the dimension of the original cylindrical hologram in the direction of said axis is significantly less than the same dimension of said image-receiving surface, thereby to produce the recorded second hologram with a significantly greater height than that of the original cylindrical hologram, directing onto said image-receiving surface at a finite angle with respect to the image rays, a reference wave which is coherent with the illumination a beam of the original hologram, thereby producing a pattern of interference fringes on the image-receiving surface, and detecting and recording as a second hologram said interference fringes.

* * * * *